(12) United States Patent
Lee

(10) Patent No.: US 7,957,691 B1
(45) Date of Patent: Jun. 7, 2011

(54) DISTRIBUTING CONTENT TO MOBILE DEVICES

(75) Inventor: Wing K. Lee, Overland Park, KS (US)

(73) Assignee: Sprint Communications Company L.P., Overland Park, KS (US)

( * ) Notice: Subject to any disclaimer, the term of this patent is extended or adjusted under 35 U.S.C. 154(b) by 687 days.

(21) Appl. No.: 11/945,076

(22) Filed: Nov. 26, 2007

(51) Int. Cl.
*H04Q 7/20* (2006.01)

(52) U.S. Cl. ............... 455/3.01; 455/3.02; 455/3.04; 455/418; 455/419; 455/426.1; 709/203; 709/202; 709/218; 709/219; 725/62

(58) Field of Classification Search ....... 455/3.01–3.06, 455/466, 426.1, 426.2, 445, 422.1, 403, 550.1, 455/452.3, 414.1–414.4, 500, 517, 418–420; 709/203, 202, 218, 219; 725/62
See application file for complete search history.

(56) References Cited

U.S. PATENT DOCUMENTS

| | | | |
|---|---|---|---|
| 7,340,214 B1 | 3/2008 | Hamberg | |
| 7,619,999 B2 | 11/2009 | DaCosta | |
| 2002/0172368 A1* | 11/2002 | Peterka | 380/278 |
| 2007/0130210 A1 | 6/2007 | Park | |
| 2008/0010372 A1 | 1/2008 | Khedouri et al. | |
| 2008/0092181 A1* | 4/2008 | Britt | 725/87 |
| 2008/0132167 A1 | 6/2008 | Bent et al. | |
| 2008/0165906 A1 | 7/2008 | Ho et al. | |
| 2008/0271095 A1 | 10/2008 | Shafton | |
| 2009/0077220 A1 | 3/2009 | Svendsen et al. | |
| 2010/0030867 A1* | 2/2010 | Yao | 709/215 |

OTHER PUBLICATIONS

Lee, Wing K., Patent Application entitled, "Peer-to-Peer Transfer of Files with Back-Office Completion," filed Sep. 19, 2007, U.S. Appl. No. 11/858,112.
Biere, Devon L., et al., Patent Application entitled "Carrier Data Based Product Inventory Management and Marketing," filed Dec. 28, 2006, U.S. Appl. No. 11/617,703.
Lee, Wing K., Patent Application entitled "System and Method for Identifying and Managing Social Circles," filed Dec. 28, 2006, U.S. Appl. No. 11/617,709.
Office Action dated Mar. 23, 2010, U.S. Appl. No. 11/858,112, 15 pages.
Office Action dated Aug. 31, 2010, U.S. Appl. No. 11/858,112, 16 pages.
Final Office Action dated Feb. 14, 2011, U.S. Appl. No. 11/858,112.

* cited by examiner

*Primary Examiner* — Keith T Ferguson

(57) ABSTRACT

Computer implemented methods and systems are provided for distributing content. Information is collected on usage of a mobile device. The information is analyzed to identify a content type preference of the mobile device. A portion of a unit of content is pushed to the mobile device, wherein the unit of content is associated with the content type preference. The remainder of the unit of content is provided to the mobile device in response to a selection of the unit of content.

18 Claims, 4 Drawing Sheets

US 7,957,691 B1

DISTRIBUTING CONTENT TO MOBILE DEVICES

CROSS-REFERENCE TO RELATED APPLICATIONS

None.

STATEMENT REGARDING FEDERALLY SPONSORED RESEARCH OR DEVELOPMENT

Not applicable.

REFERENCE TO A MICROFICHE APPENDIX

Not applicable.

BACKGROUND

Mobile devices include applications such as media players that can request content, such as music or videos, from content providers. A mobile device user typically requests a unit of content and waits for the process of downloading the requested content to complete before the mobile device can present the unit of content to the user.

SUMMARY

The present disclosure provides computer implemented methods and systems for distributing content. In some method embodiments, information is collected on usage of a mobile device. The information is analyzed to identify a content type preference of the mobile device. A portion of a unit of content is pushed to the mobile device, wherein the unit of content is associated with the content type preference. The remainder of the unit of content is provided to the mobile device in response to a selection of the unit of content.

In some system embodiments, a server collects information on usage of a mobile device, and analyzes the information to identify a content type preference of the mobile device. The server also pushes a portion of a unit of content to the mobile device, wherein the unit of content is associated with the content type preference. The server provides the remainder of the unit of content in response to a selection of the unit of content.

In some other method embodiments, a unit of content is provided to a server, wherein the unit of content is associated with a content type preference. The unit of content is stored on the server. Whether a load on the server is greater than a threshold is determined. A portion of the unit of content is pushed to a mobile device in response to determining that the load on the server is not greater than the threshold. A remainder of the unit of content is provided in response to a selection of the unit of content.

These and other features will be more clearly understood from the following detailed description taken in conjunction with the accompanying drawings and claims.

BRIEF DESCRIPTION OF THE DRAWINGS

For a more complete understanding of this disclosure, reference is now made to the following brief description, taken in connection with the accompanying drawings and detailed description, wherein like reference numerals represent like parts.

DETAILED DESCRIPTION

Figure 1:
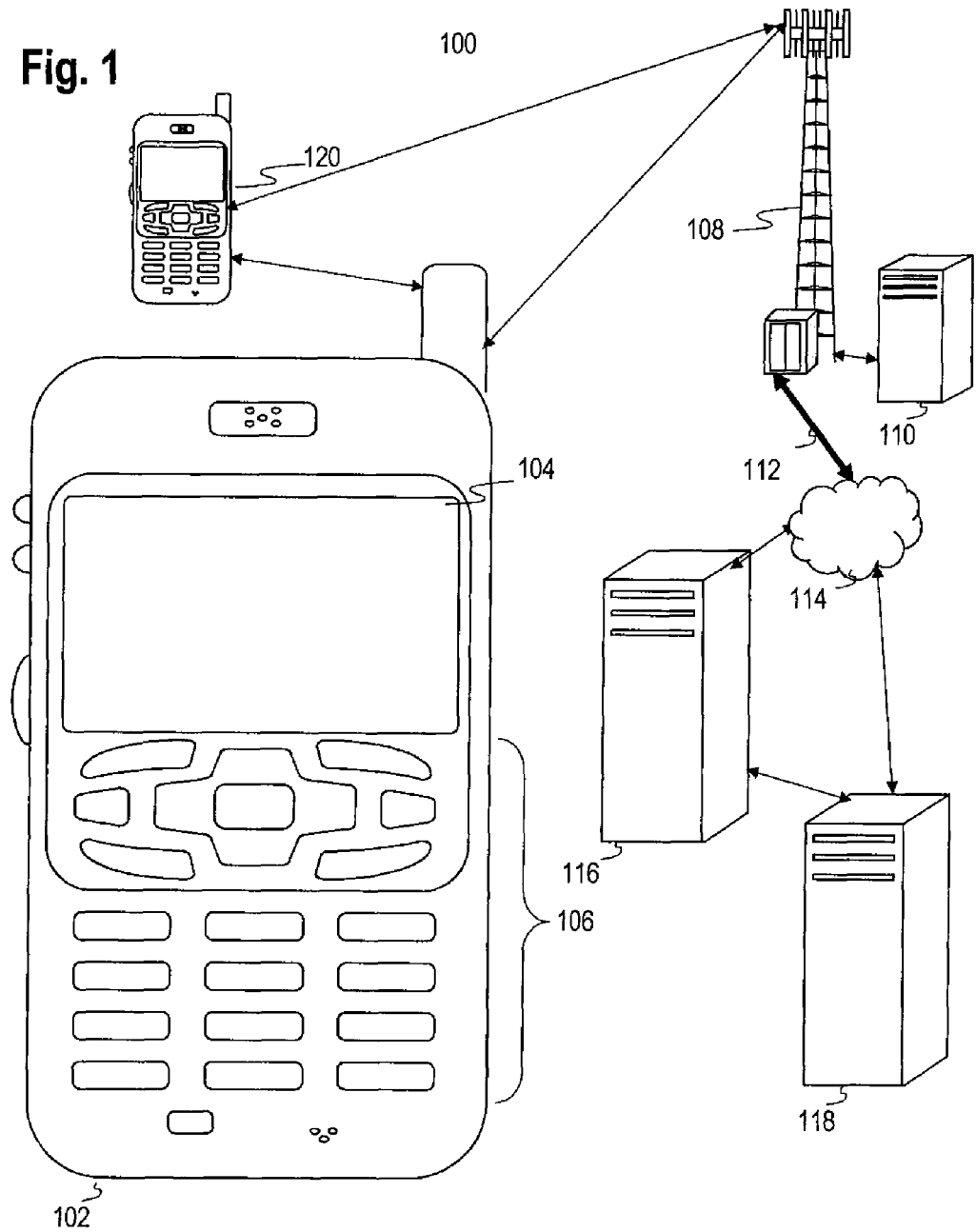
FIG. 1 shows a wireless communications system for distributing content to mobile devices according to some embodiments of the present disclosure.

It should be understood at the outset that although an illustrative implementation of one or more embodiments are provided below, the disclosed systems and/or methods may be implemented using any number of techniques, whether currently known or in existence. The disclosure should in no way be limited to the illustrative implementations, drawings, and techniques illustrated below, including the exemplary designs and implementations illustrated and described herein, but may be modified within the scope of the appended claims along with their full scope of equivalents.

The present disclosure provides computer implemented methods and systems for distributing content to mobile devices. Rather than requiring a mobile device user to wait for the downloading of requested content, a server may anticipate what content the mobile device user is likely to request based on prior usage patterns, and supply portions of the anticipated content in advance. When the mobile device user requests a unit of content, the mobile device user may have already received a portion of the content before the request. While the mobile device presents the portion of the anticipated content to the user, the server transmits the remainder of the anticipated content to the mobile device. By the time the user has finished with the portion of the anticipated content, the remainder of the anticipated content may have already been received by the mobile device, which can eliminate the delay in presenting the anticipated content to the user.

Rather than requesting content from a distribution repository each time that the content is anticipated for a mobile device, which can be expensive in the case that leased lines are used for backhauling the content, a server may request anticipated content once from the distribution repository and store the anticipated content in advance of pushing portions of the content to mobile devices. When the server, which may be part of a communication network, anticipates a request for content from a mobile device, the server may already have the content. The server may anticipate requests for content by providing a portion of anticipated content to the mobile device. If the server is too busy to provide the portion of the requested content to the mobile device, the server may identify a wirelessly accessible device that has downloaded the anticipated content and enable the mobile device to receive the anticipated content from the wirelessly accessible device. The wirelessly accessible device may provide the anticipated content to the mobile device via the communication network or via direct wireless communication.

The server can periodically push portions of content to the mobile device based on prior usage patterns, such that before any requests are made for the newest content, the mobile device already has stored the most current portions of different types of content that the mobile device has most frequently requested in the past. For example, the server may pre-push new portions of the favorite sports news of the user, favorite national news, and favorite recording artist's music videos to the mobile device.

FIG. 1 shows a wireless communications system 100 that is suitable for implementing several embodiments of the disclosure. The wireless communication system 100 includes an illustrative mobile device 102. Though illustrated as a mobile phone, the mobile device 102 may take various forms including a personal digital assistant (PDA), a mobile computer, a digital camera, a mobile phone or mobile telecommunication device, a digital music player, a mobile handset, a handheld gaming device, a wireless mobile device, a pager, a portable computer, a tablet computer, a laptop computer, and a digital calculator. Suitable devices may combine some or all of these functions. In some embodiments, the mobile device may be a mobile phone with a media player that can play audio and video.

The mobile device 102 includes a display 104 and a touch-sensitive surface or keys 106 with which the user can also interact. The mobile device 102 may present options for the user to select, controls for the user to actuate, and/or cursors or other indicators for the user to direct. The mobile device 102 may further accept data entry from the user, including numbers to dial or various parameter values for configuring the operation of the mobile device 102. The mobile device 102 may further execute one or more software or firmware applications in response to user commands. Among the various applications executable by the mobile device 102 are a media player which enables the mobile device 102 to present content to the user. These applications may configure the mobile device 102 to perform various customized functions in response to user interaction, such as downloading and viewing content, including videos.

The content is obtained via wireless communications with a cell tower 108, a wireless network access node, or another wireless communications network or system. The cell tower 108 may also be referred to as a base transceiver station (BTS). The cell tower 108 may store the content on a cell tower server 110. The cell tower 108 (or wireless network access node) is coupled via a communication link 112 to a telecommunication network 114, such as the Internet. The communication link 112 may be a leased line, such as a physical cable, that provides access to the telecommunication network 114. While one cell tower is shown in FIG. 1, other cell towers could be present. Via the wireless link and the wired network, the mobile device 102 has access to content on various servers, such as a network service server 116. The network service server 116 may provide content that may be presented on the mobile device 102. The network service server 116 may be located in the general area of the cell tower 108 and communicate with the cell tower 108 by wireless communication. Alternatively, the network service server 116 may be located remotely from the cell tower 108.

The network service server 116 in turn interacts with a distribution repository 118 via wired communication. The network service server 116 may act as a gateway to the distribution repository 118, which provides information such as content to transmit to the mobile device 102. Additionally, the distribution repository 118 may communicate directly through the telecommunication network 114.

The mobile device 102 may communicate with the distribution repository 118 through the network service server 116, the telecommunication network 114, and the cell tower 108 by a standard wireless telephony protocol (such as code division multiple access (CDMA), global system for mobile communication (GSM), universal mobile telecommunications system (UMTS), and worldwide interoperability for microwave access (WiMAX)), a wireless internet connection, or some other means of wireless communication. The mobile device 102 may also communicate with a wirelessly accessible device 120, which may be another mobile device 102, a desktop computer, or other device configured to present content.

Figure 2:
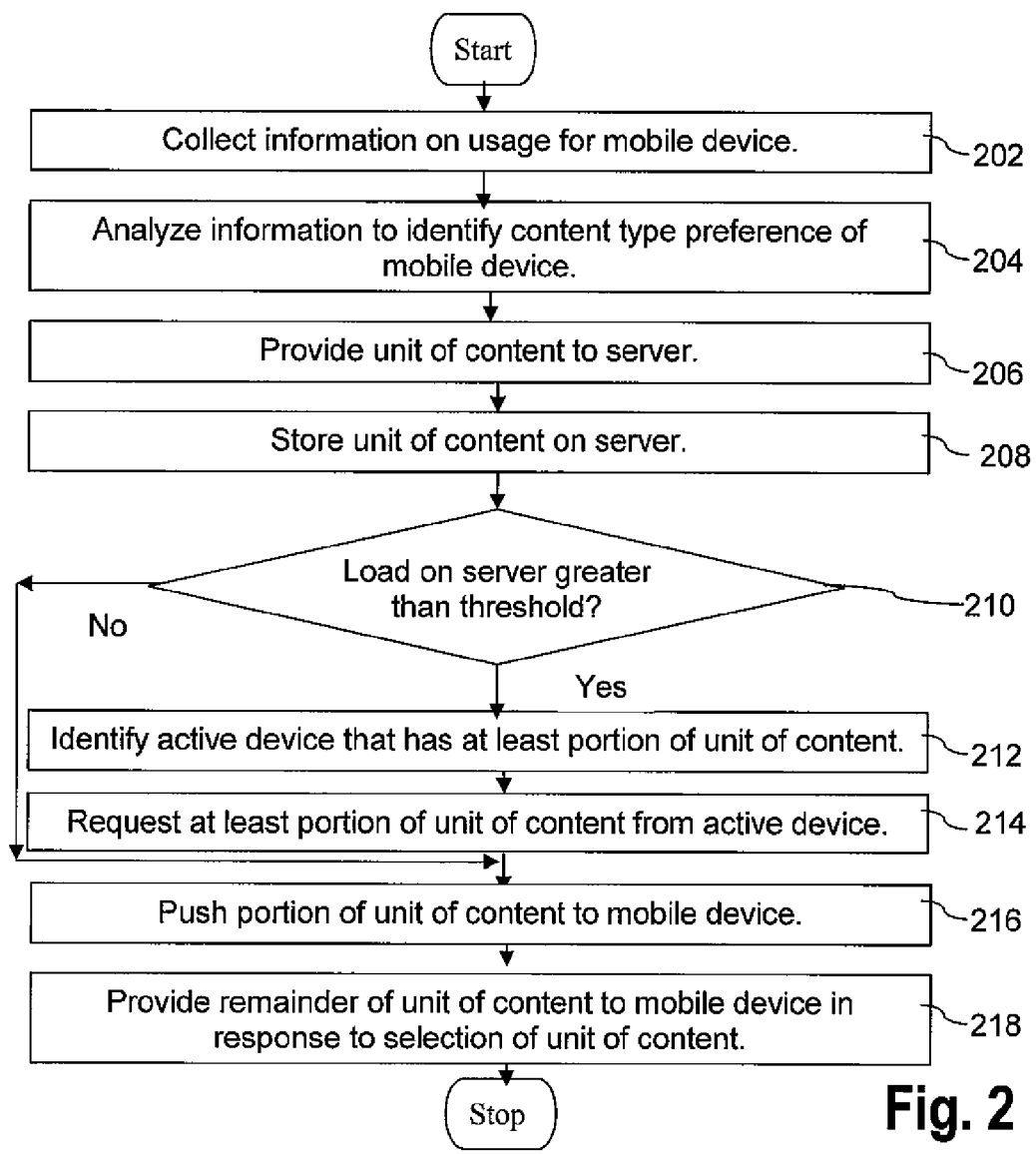
FIG. 2 shows a flowchart of a method for distributing content to mobile devices according to some embodiments of the present disclosure.

FIG. 2 is a flowchart illustrating a method for distributing content to mobile devices according to some embodiments of the present disclosure. The network service server 116 or the cell tower server 110 may execute the method to push portions of content to the mobile device 102 based on previous content requested by the mobile device 102 or by the user of the mobile device 102.

In box 202, information is collected on usage for the mobile device 102. For example, the network service server 116 collects a history or record of requests from the mobile device 102 for content, such as sports news videos, national news videos, music videos, purchases of sports memorabilia, and access to sports-oriented websites. The usage for the mobile device 102 may also include the usage history for other devices or other channels associated with the owner of the mobile device 102. The usage for the mobile device 102 may also be inferred from related or correlated requests from the mobile device 102.

In box 204, the information is analyzed to identify a content type preference of the mobile device 102. For example, the network service server 116 analyzes the content previously requested by the mobile device 102 to identify a sports content type preference. In another example, the network service server 116 analyzes the content previously requested by the mobile device 102 to identify a political content type preference. The network service server 116 may identify a plurality of content type preferences of one user based on prior usage of the mobile device 102 of the user.

In box 206, a unit of content is provided to a server, wherein the unit of content is associated with a content type preference. For example, because of one user's sports content type preference, the network service server 116 requests a current sports stories produced by a sports broadcaster from the distribution repository 118, which responds by providing the requested current sports stories to the cell tower server 110 via the communication link 112, which may be expensive leased lines. Once the current sports stories have been provided over the communication link 112 to the cell tower server 110, the cell tower 110 may provide the current sports stories repeatedly to requesting mobile devices 102 without the current sports stories incurring any more expenses for being provided via the communication link 112. In another example, because of another user's political content type preference, the network service server 116 requests current political stories produced by a political broadcaster from the distribution repository 118, which responds by providing the requested current political stories to the cell tower server 110 via wired communication. The distribution repository 118 may provide a plurality of content types to the cell tower server 110 for each mobile device 102 serviced by the network service server 116. Alternatively, the distribution repository 118 communicates through the network service server 116, the telecommunication network 114, and the communication link 112 to provide a unit of content to the cell tower server 110.

In another example, the distribution repository 118 provides the unit of content to the network service server 116, which will subsequently respond to a request by providing the unit of content via the telecommunication network 114 and the communication link 112 to the requesting mobile device 102. In yet another example, the distribution repository 118 communicates directly through the telecommunication network 114 and the communication link 112 to provide a unit of content to the mobile device 102 without storing the content in the cell tower server 110. However, leased line expenses may be incurred each time the unit of content is provided via the communication link 112.

If the content preference types for multiple mobile devices 102 indicate the same preference for specific content, the cell tower server 110 or the network service server 116 may store only one copy of the specific content and use the one copy to provide the content to each of the mobile devices 102. Storing only one copy of the specific content may reduce traffic on lines, which in some instances may be leased, to the network service server 116.

A time for the distribution repository 118 to provide the content to a server is based on a communication load. For example, when either the distribution repository 118 or the cell tower server 110 is under a heavy communication load, the distribution repository 118 may postpone providing the content to the cell tower server 110 until the communication load becomes lighter.

The unit of content may be multimedia content, such as a video. The unit of content may be a new release, such as the most recent sport stories produced by the sports broadcaster. The unit of content may be a frequently requested content, such that only content that is requested more than a specified number of times is stored on the cell tower server 110 or the network service server 116, thereby saving time and effort by screening out infrequently requested content.

For example, the sports broadcaster has produced videos for three leading sports stories. In another example, the political broadcaster has produced videos for four leading political stories.

In the present context, the leading stories are those that are considered to be of highest interest at a particular time, for example by an editor or an editorial team of a content provider. Different editors or editorial teams at different content providers may identify different sets of leading stories at any given time, due to the process of selection of leading stories being, at least in part, based on subjective judgments or based on different editorial and/or aesthetic principles. The leading stories and/or stories to store may be a small number, for example two to five stories or four stories to ten stories, at any given time. The leading stories may change over different periods of time. For example, in one content type category the lead stories may change, on average, on a daily basis or on a weekly basis. In a different content type category, however, the lead stories may change, on average, on a weekly or a monthly basis. In all of these examples, however, in exceptional circumstances a surprise event may occur that causes a sudden change in the leading stories over an atypically short period or interval of time.

In box 208, the unit of content is stored on a server. For example, the cell tower server 110 or the network service server 116 stores the sports stories produced by the sports broadcaster and also stores the political stories produced by the political broadcaster. The cell tower server 110 may store multiple types of content anticipated for each mobile device 102 serviced by the cell tower server 110. Likewise, the network service server 116 may store multiple types of content anticipated for each mobile device 102 serviced by the network service server 116.

In box 210, whether a load on a server is greater than a threshold is determined. For example, the network service server 116 determines whether the current load on the network service server 116 is greater than a network service threshold. The determination of the current load on the network service server 116 may be based on a collective pattern of all requested activity for the network service server 116, region, state, or country. The network service threshold indicates whether the network service server 116 currently has sufficient available capacity to push a portion of each of the sports stories to the mobile device 102 without reducing normal network service. Alternatively, the cell tower server 110 determines whether the current load on the cell tower server 110 is greater than a cell tower server threshold. If the server determines that the load on the server is greater than the threshold, the method continues to box 212. If the server determines that the load on the server is not greater than the threshold, the method proceeds to box 216.

In box 212, a wirelessly accessible device 120 that has at least the portion of the unit of content is identified. For example, the cell tower server 110, which is too busy to provide portions of the sports stories to the mobile device 102, identifies the local wirelessly accessible device 120 that has portions of the current sports stories. The wirelessly accessible device 120 is another local mobile device 102 if the wirelessly accessible device 120 is served by the same BTS, such as the cell tower 108, which serves the mobile device 102. When the cell tower server 110 is too busy to provide content to the mobile device 102, the cell tower server 110 can identify the wirelessly accessible device 120 that can provide the same content to the mobile device 102. Alternatively, the network service server 116 can identify the wirelessly accessible device 120 that can provide the same content to the mobile device 102 when the network service server 116 is too busy to provide content to the mobile device 102.

In box 214, at least the portion of the unit of content is requested from the wirelessly accessible device 120. For example, the cell tower server 110 requests portions of the current sports stories from the wirelessly accessible device 120, and provides an Internet protocol address or a telephone number of the mobile device 102 to the wirelessly accessible device 120. Alternatively, the network service server 116 requests portions of the current sports stories from the wirelessly accessible device 120.

In box 216, at least a portion of a unit of content is pushed to the mobile device 102. For example, the network service server 116 pushes portions of the current sports stories to the mobile device 102 when a communications load for local traffic conditions is below a threshold. The threshold indicates whether the network service server 116 currently has sufficient available capacity to provide portions of the sports stories to the mobile device 102 without reducing normal network service. However, the network service server 116 pushes the portion of the content to the mobile device 102 at a frequency that does not exceed a maximum frequency. For example, if the sports broadcaster updates the lead sports stories once every hour, the network service server 116 pushes the portion of the most current sports stories only once an hour. Alternatively, the cell tower server 110 pushes portions of the current sports stories to the mobile device 102. As yet another alternative, the wirelessly accessible device 120 uses the internet protocol address or the telephone number of the mobile device 102 to push the portions of the current sports stories to the mobile device 102 via the cell tower 108. The wirelessly accessible device 120 may push the portions of the current sports stories to the mobile device 102 by pushing the portions to the mobile device 102 via a direct wireless communication, by pushing the portions to the mobile device 102 via the cell tower 108, or by pushing the portions to the cell tower server 110 or the network service server 116, which pushes the portions to the mobile device 102.

In box 218, a remainder of the unit of content is provided to the mobile device in response to a selection of the unit of content. For example, when the unit of content that is periodically pushed to the mobile device 102 is selected, the remainder of the unit of content is provided, for example from the network service server 116 or the cell tower server 110. In an embodiment, this may be described as a partial network push and a partial mobile device 102 pull. Additionally, the wirelessly accessible device 120 may provide the remainder of the selected unit of content to the mobile device 102. For example, the portions of the sports stories pushed to the mobile device 102 may be about 25% of the total content of each of the leading sports stories, accompanied by capability to select to view the content of a sports story, which causes the remainder of the selected sports story to be provided to the mobile device 102. Although about 25% of the total content of the lead stories are initially pushed in this example, in other embodiments other percentages of the total content of the lead stories may be initially pushed. For additional information about storing and retrieving portions of content, see U.S. patent application Ser. No. 11/858,112, filed Sep. 19, 2007, entitled "Peer-to-Peer Transfer of Files with Back-Office Completion," by Kevin Zhu.

In another embodiment, an effective portion of the lead story is pushed to the mobile device 102 to promote reducing time waiting for the remainder of the story to be provided from the cell tower server 110 or the network service server 116. This effective portion of the lead story may be a data size that is based on the content consumption speed of a user of the mobile device 102, where the content consumption speed may be based on how many different units of content the user reads, views, listens to, or otherwise consumes, how much of each unit of content is read, viewed, listened to, or otherwise consumed by the user, or any combination thereof. For example, a first user may read, view, or otherwise consume content more rapidly than a second user. In an embodiment, the effective portion of the lead story initially pushed to the first user may be larger in number of bytes or other measure of content volume than the effective portion of the lead story pushed to the second user. In some cases, if the lead story is small enough, the entire lead story may be initially pushed to the mobile device 102. In an embodiment, the rate of content consumption of different users may be configured. In another embodiment, the different rates of content consumption may be determined by the network service server 116 or the cell tower server 110 by monitoring behavior of different users or monitoring content accessing patterns of mobile devices 102. In another embodiment, the different rates of content consumption and the effective portion of the lead story to be initially pushed to the mobile device 102 may be based, at least in part, on the content type.

For example, a user reviews the summaries of several sports stories displayed by the mobile device 102, including a ten word summary of the sports stories. When the user selects to view a sports story, the portions of the sports stories already pushed to the mobile device 102 may already includes 25% of the selected sports story. While the user is viewing the pre-pushed about 25% of the selected sports story, the remaining about 75% of the selected sports story is provided to the mobile device 102. By the time the user finishes watching the leading about 25% of the selected sports story, the user may view the remaining content of the selected sports story without any delay for downloading. By pre-pushing portions of the content, delay in providing the content is reduced without consuming the bandwidth or the memory on the mobile device 102 that would be required by pre-pushing 100% of the content.

While 25% is an example of the unit of content pushed to the mobile device 102, the actual amount of the unit of content that is pushed is based on equating the time required to consume the unit of content with the time required to stream or provide the remainder of the unit of content. For example, if streaming or providing 100% of a selected sports story video to the mobile device 102 requires 15 seconds, and viewing 100% of the sports story video requires 60 seconds, the effective amount for the unit of content may be 20%. Viewing 20% of the unit of content requires 12 seconds, which is also the amount of time required to stream or provide the remaining 80% of the unit of content. Therefore, when the user of the mobile device 102 selects the sports story video, the user views the first 20% of the selected sports story video for 12 seconds while the remaining 80% of the selected sports story video is streamed or provided to the mobile device 102. When the 12 seconds of viewing the first 20% of the selected sports story video is completed, the mobile device 102 already has the remaining 80% of the selected sports story video. The user views the remaining 80% of the selected sports story video seamlessly at the end of the first 20% of the selected sports story video, as if the mobile device 102 already had 100% of the selected sports story video before the user selected the sports story video. It will be readily understood that in some embodiments the portion of unit of content pushed to the mobile device 102 may be based on the content consumption rate of an average user, an $85^{th}$ percentile user, a $35^{th}$ percentile user, or some other statistical standard. If the unit of anticipated content is small enough, the network service server 116 or the cell tower server 110 may push the entire unit of anticipated content, not just a portion of the unit of anticipated content, to the mobile device 102.

In another example, the sports broadcaster produces some new sports stories for release at a later time. In one embodiment, the network service server 116 or the cell tower server 110 pushes the new or updated sports stories to the mobile device 102, but does not push the sports stories previously pushed to the mobile device 102.

In another embodiment, the political broadcaster produces new political stories for release at a later time. Because the political broadcaster considers some of the previously produced political stories to still be among the current political stories, the network service server 116 or the cell tower server 110 pushes all of the current political stories to the mobile device 102. Because the mobile device 102 has already stored the previously pushed political stories, the mobile device 102 only stores the new political stories. The user may review the summaries of the current political stories displayed by the mobile device 102. The mobile device 102 may have stored a specific previously produced political story that is no longer included in the current political stories, but because of the update to the leading political stories, the specific previously produced political story is deleted from the mobile device 102 without having been viewed, or without the summary of the story being read. Additionally, if the user requests political stories in addition to viewing the sports stories, the user's updated content type preferences may include both sports stories and political stories. In response to the user's updated content type preferences, the network service server 116 or the cell tower server 110 pushes both the updated sports stories and the updated political stories to the mobile device 102.

Figure 3:
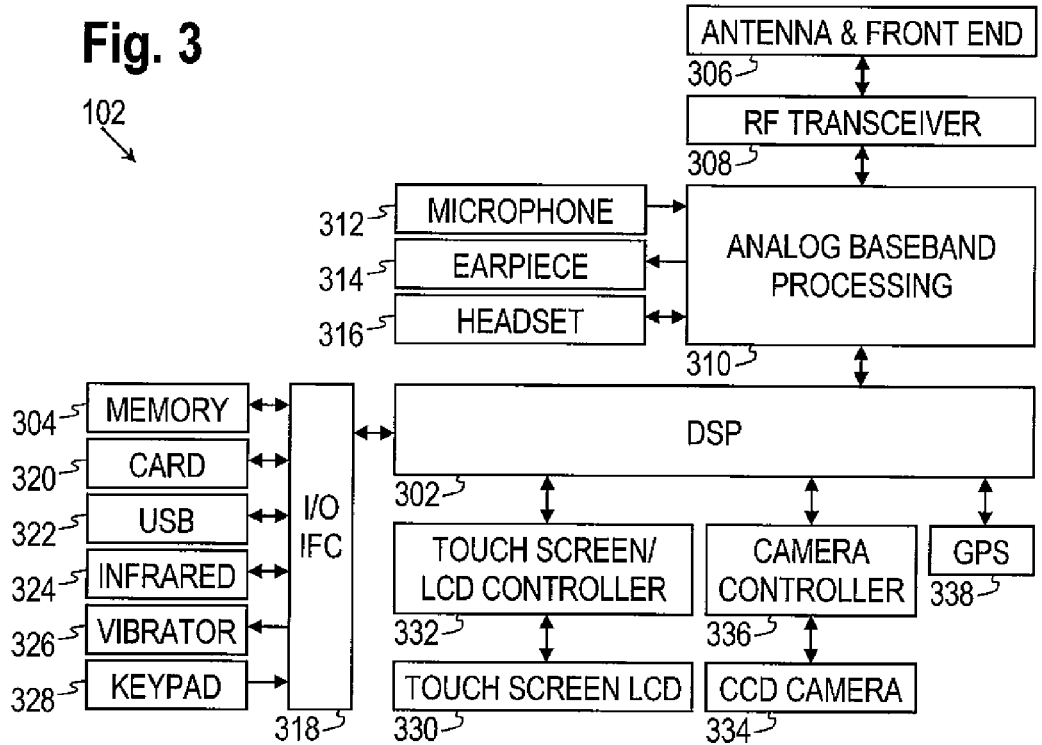
FIG. 3 shows a block diagram of an illustrative mobile device.

FIG. 3 shows a block diagram of the mobile device or handset 102. While a variety of known components of handsets 102 are depicted, in an embodiment a subset of the listed components and/or additional components not listed may be included in the handset 102. The handset 102 includes a digital signal processor (DSP) 302 and a memory 304. As shown, the handset 102 may further include an antenna and front end unit 306, a radio frequency (RF) transceiver 308, an analog baseband processing unit 310, a microphone 312, an earpiece speaker 314, a headset port 316, an input/output interface 318, a removable memory card 320, a universal serial bus (USB) port 322, an infrared port 324, a vibrator 326, a keypad 328, a touch screen liquid crystal display (LCD) with a touch sensitive surface 330, a touch screen/LCD controller 332, a charge-coupled device (CCD) camera 334, a camera controller 336, and a global positioning system (GPS) sensor 338. In an embodiment, the handset 102 may include another kind of display that does not provide a touch sensitive screen. In an embodiment, the DSP 302 may communicate directly with the memory 304 without passing through the input/output interface 318.

The DSP 302 or some other form of controller or central processing unit operates to control the various components of the handset 102 in accordance with embedded software or firmware stored in memory 304 or stored in memory contained within the DSP 302 itself. In addition to the embedded software or firmware, the DSP 302 may execute other applications stored in the memory 304 or made available via information carrier media such as portable data storage media like the removable memory card 320 or via wired or wireless network communications. The application software may comprise a compiled set of machine-readable instructions that configure the DSP 302 to provide the desired functionality, or the application software may be high-level software instructions to be processed by an interpreter or compiler to indirectly configure the DSP 302.

The antenna and front end unit 306 may be provided to convert between wireless signals and electrical signals, enabling the handset 102 to send and receive information from a cellular network or some other available wireless communications network or from a peer handset 102. In an embodiment, the antenna and front end unit 306 may include multiple antennas to support beam forming and/or multiple input multiple output (MIMO) operations. As is known to those skilled in the art, MIMO operations may provide spatial diversity which can be used to overcome difficult channel conditions and/or increase channel throughput. The antenna and front end unit 306 may include antenna tuning and/or impedance matching components, RF power amplifiers, and/or low noise amplifiers.

The RF transceiver 308 provides frequency shifting, converting received RF signals to baseband and converting baseband transmit signals to RF. In some descriptions a radio transceiver or RF transceiver may be understood to include other signal processing functionality such as modulation/demodulation, coding/decoding, interleaving/deinterleaving, spreading/despreading, inverse fast fourier transforming (IFFT)/fast fourier transforming (FFT), cyclic prefix appending/removal, and other signal processing functions. For the purposes of clarity, the description here separates the description of this signal processing from the RF and/or radio stage and conceptually allocates that signal processing to the analog baseband processing unit 310 and/or the DSP 302 or other central processing unit. In some embodiments, the RF Transceiver 408, portions of the antenna and front end 306, and the analog baseband processing unit 310 may be combined in one or more processing units and/or application specific integrated circuits (ASICs).

The analog baseband processing unit 310 may provide various analog processing of inputs and outputs, for example analog processing of inputs from the microphone 312 and the headset port 316 and outputs to the earpiece speaker 314 and the headset port 316. To that end, the analog baseband processing unit 310 may have ports for connecting to the built-in microphone 312 and the earpiece speaker 314 that enable the handset 102 to be used as a cell phone. The analog baseband processing unit 310 may further include a port for connecting to a headset or other hands-free microphone and speaker configuration. The analog baseband processing unit 310 may provide digital-to-analog conversion in one signal direction and analog-to-digital conversion in the opposing signal direction. In some embodiments, at least some of the functionality of the analog baseband processing unit 310 may be provided by digital processing components, for example by the DSP 302 or by other central processing units.

The DSP 302 may perform modulation/demodulation, coding/decoding, interleaving/deinterleaving, spreading/despreading, inverse fast fourier transforming (IFFT)/fast fourier transforming (FFT), cyclic prefix appending/removal, and other signal processing functions associated with wireless communications. In an embodiment, for example in a code division multiple access (CDMA) technology application, for a transmitter function the DSP 302 may perform modulation, coding, interleaving, and spreading, and for a receiver function the DSP 302 may perform despreading, deinterleaving, decoding, and demodulation. In another embodiment, for example in an orthogonal frequency division multiplex access (OFDMA) technology application, for the transmitter function the DSP 302 may perform modulation, coding, interleaving, inverse fast fourier transforming, and cyclic prefix appending, and for a receiver function the DSP 302 may perform cyclic prefix removal, fast fourier transforming, deinterleaving, decoding, and demodulation. In other wireless technology applications, yet other signal processing functions and combinations of signal processing functions may be performed by the DSP 302.

The DSP 302 may communicate with a wireless network via the analog baseband processing unit 310. In some embodiments, the communication may provide Internet connectivity, enabling a user to gain access to content on the Internet and to send and receive e-mail or text messages. The input/output interface 318 interconnects the DSP 302 and various memories and interfaces. The memory 304 and the removable memory card 320 may provide software and data to configure the operation of the DSP 302. Among the interfaces may be the USB port 322 and the infrared port 324. The USB port 322 may enable the handset 102 to function as a peripheral device to exchange information with a personal computer or other computer system. The infrared port 324 and other optional ports such as a Bluetooth interface or an IEEE 802.11 compliant wireless interface may enable the handset 102 to communicate wirelessly with other nearby handsets and/or wireless base stations.

The input/output interface 318 may further connect the DSP 302 to the vibrator 326 that, when triggered, causes the handset 102 to vibrate. The vibrator 326 may serve as a mechanism for silently alerting the user to any of various events such as an incoming call, a new text message, and an appointment reminder.

The keypad 328 couples to the DSP 302 via the input/output interface 318 to provide one mechanism for the user to make selections, enter information, and otherwise provide input to the handset 102. Another input mechanism may be the touch screen LCD 330, which may also display text and/or graphics to the user. The touch screen LCD controller 332 couples the DSP 302 to the touch screen LCD 330.

The CCD camera 334 enables the handset 102 to take digital pictures. The DSP 302 communicates with the CCD camera 334 via the camera controller 336. The GPS sensor 338 is coupled to the DSP 302 to decode global positioning system signals, thereby enabling the handset 102 to determine its position. In another embodiment, a camera operating according to a technology other than Charge Coupled Device cameras may be employed. Various other peripherals may also be included to provide additional functions, e.g., radio and television reception.

Figure 4:
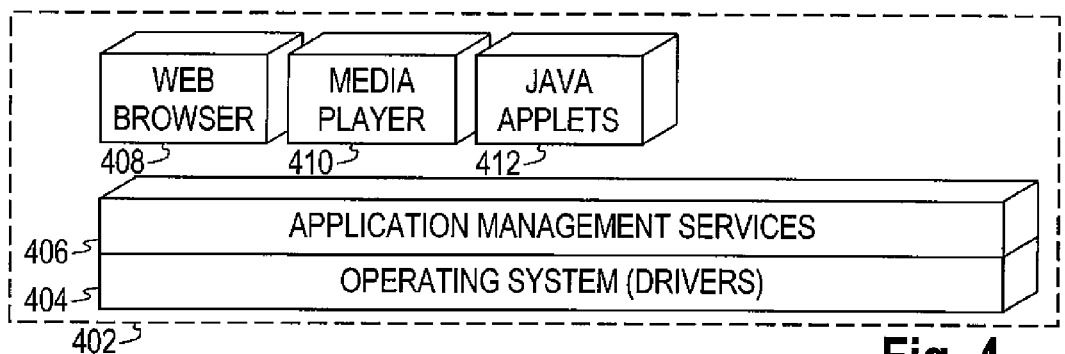
FIG. 4 shows a block diagram of an illustrative software configuration for a mobile device.

FIG. 4 illustrates a software environment 402 that may be implemented by the DSP 302. The DSP 302 executes operating system drivers 404 that provide a platform from which the rest of the software operates. The operating system drivers 404 provide drivers for the handset hardware with standardized interfaces that are accessible to application software. The operating system drivers 404 include application management services ("AMS") 406 that transfer control between applications running on the handset 102. Also shown in FIG. 4 are a web browser application 408, a media player application 410, and JAVA applets 412. The web browser application 408 configures the handset 102 to operate as a web browser, allowing a user to enter information into forms and select links to retrieve and view web pages. The media player application 410 configures the handset 102 to retrieve and play audio or audiovisual media. The JAVA applets 412 configure the handset 102 to provide games, utilities, and other functionality.

Figure 5:
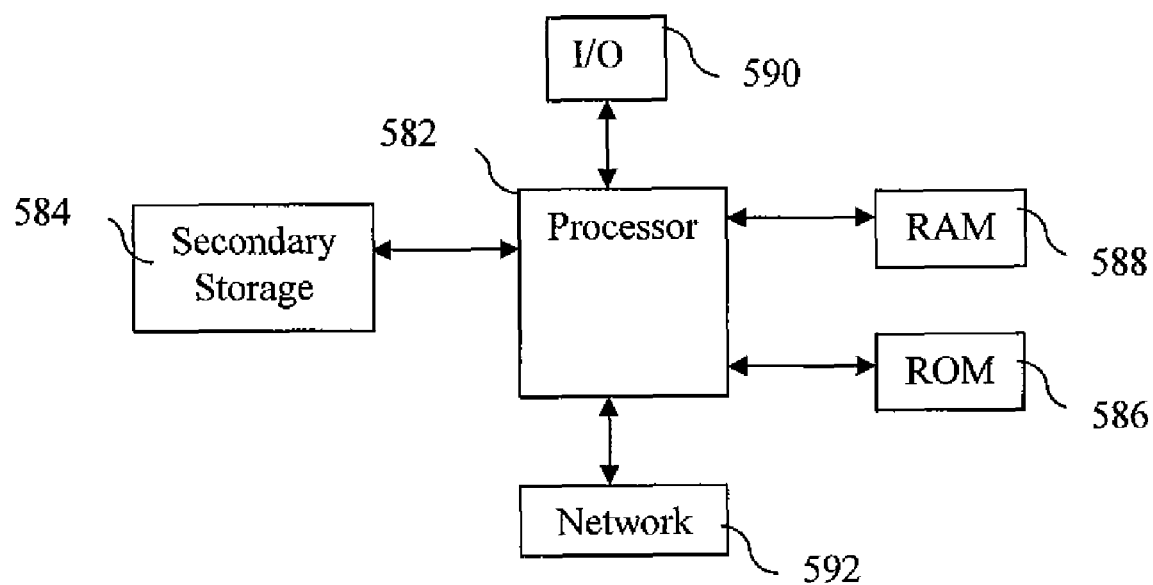
FIG. 5 illustrates an exemplary general purpose computer system suitable for implementing the several embodiments of the disclosure.

The system described above may be implemented on any general-purpose computer with sufficient processing power, memory resources, and network throughput capability to handle the necessary workload placed upon it. FIG. 5 illustrates a typical, general-purpose computer system, such as the network service server 116, suitable for implementing one or more embodiments disclosed herein. The computer system 580 includes a processor 582 (which may be referred to as a central processor unit or CPU) that is in communication with memory devices including secondary storage 584, read only memory (ROM) 586, random access memory (RAM) 588, input/output (I/O) devices 590, and network connectivity devices 592. The processor may be implemented as one or more CPU chips.

The secondary storage 584 is typically comprised of one or more disk drives or tape drives and is used for non-volatile storage of data and as an over-flow data storage device if the RAM 588 is not large enough to hold all working data. Secondary storage 584 may be used to store programs which are loaded into the RAM 588 when such programs are selected for execution. The ROM 586 is used to store instructions and perhaps data which are read during program execution. The ROM 586 is a non-volatile memory device which typically has a small memory capacity relative to the larger memory capacity of secondary storage. The RAM 588 is used to store volatile data and perhaps to store instructions. Access to both the ROM 586 and the RAM 588 is typically faster than to the secondary storage 584.

The I/O devices 590 may include printers, video monitors, liquid crystal displays (LCDs), touch screen displays, keyboards, keypads, switches, dials, mice, track balls, voice recognizers, card readers, paper tape readers, or other well-known input devices. The network connectivity devices 592 may take the form of modems, modem banks, ethernet cards, universal serial bus (USB) interface cards, serial interfaces, token ring cards, fiber distributed data interface (FDDI) cards, wireless local area network (WLAN) cards, radio transceiver cards such as code division multiple access (CDMA), worldwide interoperability for microwave access (WiMAX), and/or global system for mobile communications (GSM) radio transceiver cards, and other well-known network devices. These network connectivity devices 592 may enable the processor 582 to communicate with an Internet or one or more intranets. With such a network connection, it is contemplated that the processor 582 might receive information from the network, or might output information to the network in the course of performing the above-described method steps. Such information, which is often represented as a sequence of instructions to be executed using the processor 582, may be received from and outputted to the network, for example, in the form of a computer data signal embodied in a carrier wave.

Such information, which may include data or instructions to be executed using the processor 582 for example, may be received from and outputted to the network, for example, in the form of a computer data baseband signal or signal embodied in a carrier wave. The baseband signal or signal embodied in the carrier wave generated by the network connectivity devices 592 may propagate in or on the surface of electrical conductors, in coaxial cables, in waveguides, in optical media, for example optical fiber, or in the air or free space. The information contained in the baseband signal or signal embedded in the carrier wave may be ordered according to different sequences, as may be desirable for either processing or generating the information or transmitting or receiving the information. The baseband signal or signal embedded in the carrier wave, or other types of signals currently used or hereafter developed, referred to herein as the transmission medium, may be generated according to several methods well known to one skilled in the art.

The processor 582 executes instructions, codes, computer programs, scripts which it accesses from hard disk, floppy disk, optical disk (these various disk based systems may all be considered the secondary storage 584), the ROM 586, the RAM 588, or the network connectivity devices 592.

While several embodiments have been provided in the present disclosure, it should be understood that the disclosed systems and methods may be embodied in many other specific forms without departing from the spirit or scope of the present disclosure. The present examples are to be considered as illustrative and not restrictive, and the intention is not to be limited to the details given herein. For example, the various elements or components may be combined or integrated in another system or certain features may be omitted, or not implemented.

Also, techniques, systems, subsystems and methods described and illustrated in the various embodiments as discrete or separate may be combined or integrated with other systems, modules, techniques, or methods without departing from the scope of the present disclosure. Other items shown or discussed as coupled or directly coupled or communicating with each other may be indirectly coupled or communicating through some interface, device, or intermediate component whether electrically, mechanically, or otherwise. Other examples of changes, substitutions, and alterations are ascertainable by one skilled in the art and could be made without departing from the spirit and scope disclosed herein.

What is claimed is:

1. A method for distributing content, comprising:
    collecting an information on usage of a mobile device;
    analyzing the information to identify a content type preference of the mobile device;
    prior to a selection of a unit of content, pushing a portion of the unit of content to the mobile device, wherein the unit of content is associated with the content type preference, and wherein a size of the portion of the unit of content is less than about 25% of a size of the unit of content; and
    providing a remainder of the unit of content to the mobile device in response to the selection of the unit of content.

2. The computer implemented method of claim 1, wherein the information comprises at least one of a plurality of past content requests, a plurality of on-line purchase records, and a plurality of websites accessed.

3. The computer implemented method of claim 1, wherein the content type preference indicates a previous type of content downloaded to the mobile device.

4. The computer implemented method of claim 1, further comprising selecting the unit of content associated with the content type preference, and pushing a portion of an updated unit of content to the mobile device, wherein the updated unit of content is associated with the content type preference.

5. A system for distributing content, comprising:
a server configured to collect an information on usage of a mobile device, to analyze the information to identify a content type preference of the mobile device, to push a portion of a unit of content to the mobile device prior to a selection of the unit of content, wherein the unit of content is associated with the content type preference, and to provide a remainder of the unit of content to the mobile device in response to the selection of the unit of content, wherein the server is further configured to push a portion of an updated unit of content to the mobile device at a frequency that does not exceed a maximum frequency, and wherein the updated unit of content is associated with the content type preference.

6. The system of claim 5, wherein the content is a multimedia content.

7. A system for distributing content, comprising:
a server configured to collect an information associated with a mobile device, to analyze the information to identify a content type preference of the mobile device, to push a portion of a unit of content to the mobile device, wherein the unit of content is associated with the content type preference, and to provide a remainder of the unit of content to the mobile device in response to a selection of the unit of content, wherein the server is further configured to push the at least the portion of the unit of content to the mobile device when a communication load for local traffic conditions is below a threshold.

8. A computer implemented method for distributing content to mobile devices, comprising:
providing a unit of content to a server, wherein the unit of content is associated with a content type preference;
storing the unit of content on the server;
determining whether a load on the server is greater than a threshold;
pushing a portion of the unit of content to a mobile device in response to determining that the load on the server is not greater than the threshold; and
providing a remainder of the unit of content to the mobile device in response to a selection of the unit of content.

9. The computer implemented method of claim 8, wherein providing the unit of content to the server comprises providing the unit of content to the server via wired communication.

10. The computer implemented method of claim 8, wherein a time for providing the unit of content to the server is based on a communication load.

11. The computer implemented method of claim 8, wherein the unit of content is a new release.

12. The computer implemented method of claim 8, wherein the unit of content is a frequently requested content.

13. The computer implemented method of claim 8, wherein the server is in communication with a cell tower.

14. The computer implemented method of claim 13, wherein the server communicates with the cell tower via wireless communication.

15. The computer implemented method of claim 8, further comprising:
identifying another device that has the at least the portion of the unit of content in response to determining that the load on the server is greater than the threshold; and
requesting the at least the portion of the unit of content from the other device.

16. The computer implemented method of claim 15, wherein requesting the at least the portion of the unit of content from the other device comprises providing an internet protocol address of the mobile device to the other device.

17. The computer implemented method of claim 15, wherein the other device is a local mobile device.

18. The computer implemented method of claim 15, wherein pushing the at least the portion of the unit of content to the mobile device comprises the other device communicating with the mobile device via a cell tower.

* * * * *